(12) United States Patent
Peng et al.

(10) Patent No.: US 9,472,240 B2
(45) Date of Patent: Oct. 18, 2016

(54) VIDEO EDITING METHOD AND VIDEO EDITING DEVICE

(71) Applicant: Acer Incorporated, New Taipei (TW)

(72) Inventors: Yan-Tsung Peng, Taipei (TW); Shih-Chia Huang, Taipei (TW); Bo-Hao Chen, Taipei (TW); Ming-Kai Jiau, Taipei (TW); Sy-Yen Kuo, Taipei (TW)

(73) Assignee: Acer Incorporated, New Taipei (TW)

( * ) Notice: Subject to any disclaimer, the term of this patent is extended or adjusted under 35 U.S.C. 154(b) by 746 days.

(21) Appl. No.: 13/786,483

(22) Filed: Mar. 6, 2013

(65) Prior Publication Data

US 2014/0161422 A1   Jun. 12, 2014

(30) Foreign Application Priority Data

Dec. 6, 2012  (TW) .............................. 101145831 A

(51) Int. Cl.
| | |
|---|---|
| *G11B 27/10* | (2006.01) |
| *G11B 27/034* | (2006.01) |
| *G11B 27/34* | (2006.01) |
| *H04N 9/87* | (2006.01) |

(52) U.S. Cl.
CPC .......... *G11B 27/105* (2013.01); *G11B 27/034* (2013.01); *G11B 27/34* (2013.01); *H04N 9/87* (2013.01)

(58) Field of Classification Search
CPC ... G11B 27/034; G11B 27/105; G11B 27/34; G06F 3/048

USPC .................................................. 386/278–290
See application file for complete search history.

(56) References Cited

U.S. PATENT DOCUMENTS

| | | | | |
|---|---|---|---|---|
| 6,587,506 B1 * | 7/2003 | Noridomi | ........ | H04N 21/23406 348/705 |
| 2005/0259946 A1 * | 11/2005 | Kitamura | ......... | H04N 21/23424 386/283 |
| 2014/0003506 A1 * | 1/2014 | Wang | ..................... | H04N 19/70 375/240.12 |

FOREIGN PATENT DOCUMENTS

EP                926678        *   6/1999   ........... G11B 27/031

* cited by examiner

*Primary Examiner* — Gelek W Topgyal
(74) *Attorney, Agent, or Firm* — Jianq Chyun IP Office

(57) ABSTRACT

A video editing method for a video editing device is provided. The method includes: obtaining an editing segment of a video, wherein the editing segment follows a first segment of the video and precedes a second segment of the video, the first segment includes a first picture, the second segment includes a second picture, and a short-term reference index of the second picture points to the first picture; setting a header of a third picture in the first segment, such that the first picture is moved from a short-term reference picture list to a long-term reference picture list when the header of the third picture is decoded; changing the short-term reference index of the second picture into a long-term reference index, wherein the long-term reference index points to the first picture in the long-term reference picture list; and encoding the video. Accordingly, the speed of editing the video is increased.

20 Claims, 13 Drawing Sheets

VIDEO EDITING METHOD AND VIDEO EDITING DEVICE

CROSS-REFERENCE TO RELATED APPLICATION

This application claims the priority benefit of Taiwan application serial no. 101145831, filed on Dec. 6, 2012. The entirety of the above-mentioned patent application is hereby incorporated by reference herein and made a part of this specification.

BACKGROUND

1. Technical Field

The invention relates to a video editing device and a video editing method.

2. Description of Related Art

Along with the widespread of a video capture device, a video may be obtained easily by a user. The video are usually compressed and stored in a bit stream format. When the user is to edit the video, the bit stream is first decoded to form a plurality of pictures and then the pictures are edited. After editing the pictures, the pictures are required to be recompressed. However, the step of re-compression usually requires a large amount of computation. For example, the computation includes a discrete cosine transform, a motion estimation or the likes. In some mobile devices, the computation mentioned above may take a lot of time, and thus affecting the experience of operating the devices. Therefore, the issue of how to increase the speed of video editing is a concern for those having ordinary skill in the art.

SUMMARY

The embodiments of the invention provide a video editing method for a video editing device, which increases the speed of the video editing.

The embodiments of the invention provide a video editing method for a video editing device. The method includes: obtaining an editing segment of a video, wherein the editing segment follows a first segment of the video and precedes a second segment of the video, the first segment includes a first picture, the second segment includes a second picture, and a short-term reference index of the second picture points to the first picture; setting a header of a third picture in the first segment, such that the first picture is moved from a short-term reference picture list to a long-term reference picture list when the header of the third picture is decoded; changing the short-term reference index of the second picture into a long-term reference index, wherein the long-term reference index points to the first picture in the long-term reference picture list; and encoding the video.

From another viewpoint, an embodiment of the invention set forth a video editing device including a memory and a processor. The memory stores a plurality of commands. The processor is coupled to the memory, and configured to execute the commands to execute a plurality of steps: obtaining an editing segment of a video, wherein the editing segment follows a first segment of the video and precedes a second segment of the video, wherein the first segment includes a first picture, the second segment includes a second picture, and a short-term reference index of the second picture points to the first picture; setting a header of a third picture of the first segment, wherein the first picture is moved from a short-term reference picture list to a long-term reference picture list when the header of the third picture is decoded; changing the short-term reference index of the second picture to a long-term reference index, wherein the long-term reference index points to the first picture in the long-term reference picture list; and encoding the video.

Based on the above, the embodiments of the invention set forth a video editing method and a video editing device, which increase the speed of the video editing through a management of a short-teem reference picture list and a long-term reference picture list.

In order to make the features and advantages of the present disclosure more comprehensible, the present disclosure is further described in detail in the following with reference to the embodiments and the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
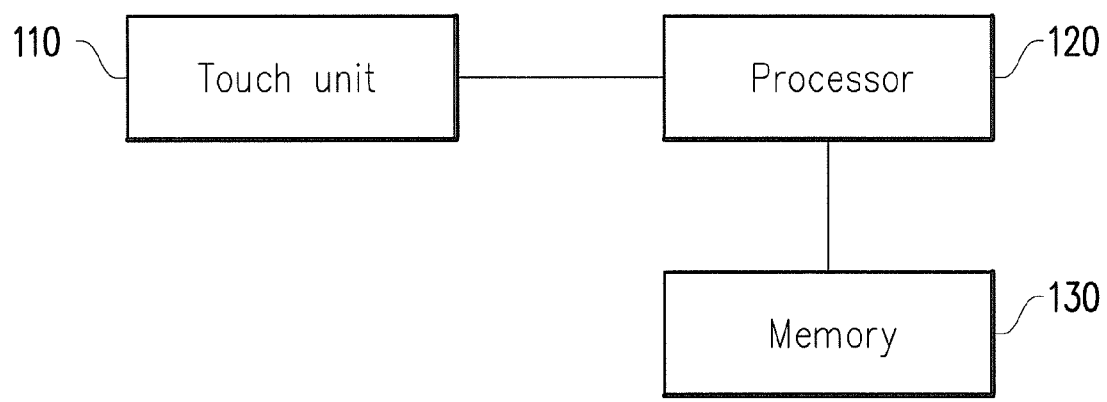
FIG. 1 is a block diagram illustrating a video editing device according to an embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram illustrating a video editing device according to an embodiment of the invention.

With reference to FIG. 1, the video editing device 100 includes a touch unit 110, a processor 120, and a memory 130. The video editing device 100 may be implemented as a smart phone, a tablet computer, a notebook computer, or a smart television (TV).

The touch unit 110 is configured to detect a touch operation of a medium. For example, the touch unit 110 includes a touch panel, the touch panel may be combinations of a liquid crystal display (LCD), a light-emitting diode (LED) display, a field emission display (FED) or the likes with a resistance-type, capacitive-type or any other type of touch sensing units, so that the functions of display and touch control may be provided simultaneously.

The processor 120 is configured to control the overall operation of the video editing device 100. For example, the processor 120 may be a central processing unit (CPU), a microprocessor, a digital signal processor (DSP), a programmable controller, an application specific integrated circuits (ASIC), or a programmable logic device (PLD).

The memory 130 is configured to store data and program code. For example, the memory 130 may be a dynamic random access memory (DRAM), a static random access memory (SRAM), or a flash memory. In an embodiment, the processor 120 executes the program code stored in the memory 130 so as to provide the function of video editing.

Figure 2:
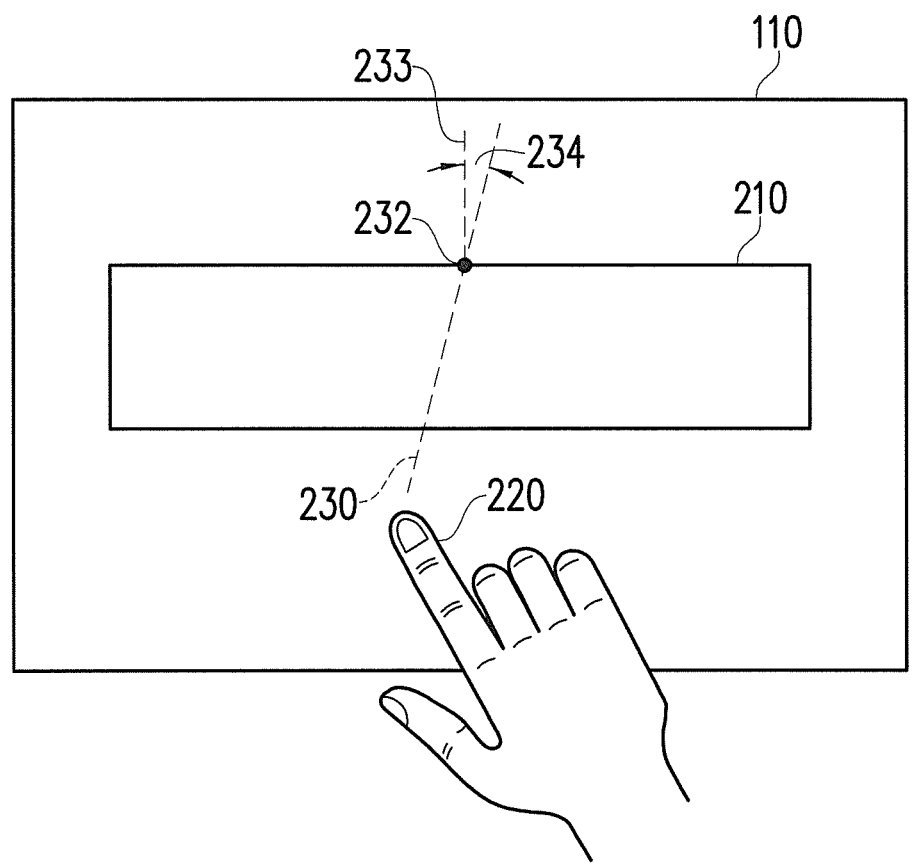
FIGS. 2 and 3 are diagrams illustrating the acquisition of an editing segment according to an embodiment.
Figure 3:
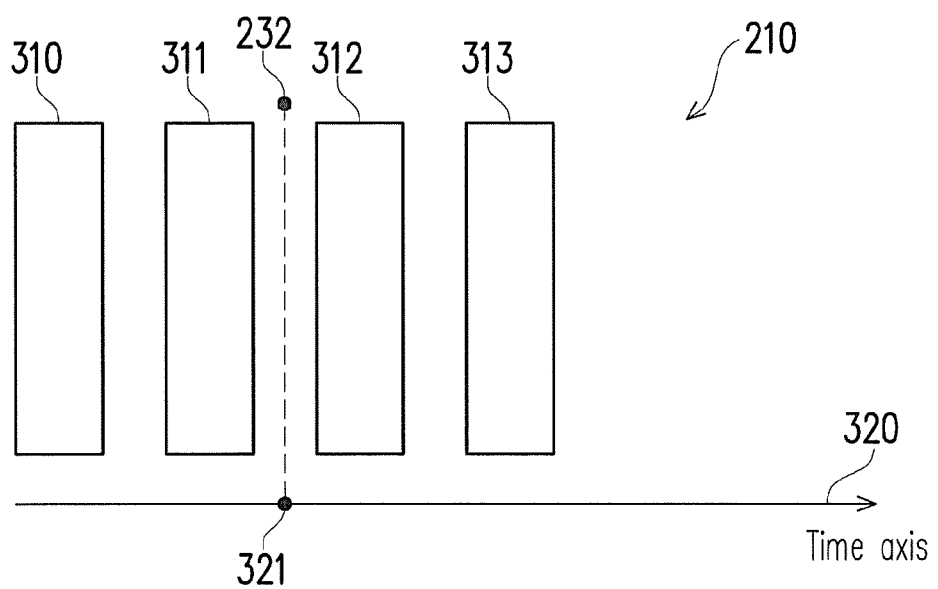

FIGS. 2 and 3 are diagrams illustrating the acquisition of a video editing segment according to an embodiment.

After a video is selected for video editing by a user, the processor 120 receives a bit stream of the compressed video and decodes the bit stream. The processor 120 displays a graphical object 210 corresponding to the video on the touch unit 110. The user may select a segment out of the selected video according to the graphical object 210. For example, the processor 120 first detects a track 230 generated by the movement of a medium 220 on the touch unit 110. It is assumed that the medium 220 moves from top to bottom along with the track 230, the track 230 and the graphical object 210 first intersect at an intersection point 232, and the track 230 and a normal line at the intersection point 232 forms an included angle 234. The processor 120 determines whether the included angle 234 is less than a threshold value. If the included angle 234 is less than the threshold value, the processor 120 determines an initial editing picture according to the intersection point 232. If the included angle 234 is greater than or equal to the threshold value, the processor 120 do nothing and keep on detecting the next track until the included angle is less than the threshold value. The initial editing picture means that the user is to edit the video starting from the initial editing picture. Although, it is not illustrated in the figures, the processor 120 may further display the detailed picture of the initial editing picture on the touch unit 110, and allows the user to check the accuracy of the starting point for video editing. If the initial editing picture is not the time point for the user to start video editing, the user may select the initial editing picture again by input another track through touching the touch unit.

As illustrated in FIG. 3, the graphical object 210 includes a plurality of sub-graphical objects 310-313, and each of the sub-graphical objects 310-313 corresponds to a picture in the video. If the intersection point 232 is positioned on one sub-graphical object, the picture corresponding to the sub-graphical object is the initial editing picture. However, if the intersection point 232 is positioned between two sub-graphical objects, the processor 120 selects one of the two sub-graphical objects to be the initial editing picture. For example, in the example illustrated in FIG. 3, the intersection point 232 falls between the sub-graphical object 311 and the sub-graphical object 312, the processor 120 may select the picture corresponding to the sub-graphical object 311 or the sub-graphical object 312 to be the initial editing picture. For the ease of illustration, a time axis 320 is utilized to represent a section of the video, and each of the pictures within the video corresponds to a time point on the time axis. A time point 321 corresponding to the initial editing picture is determined according to the intersection point 232. It should be noted that the time axis 320 is a logical concept, and the processor 120 does not display the time axis 320 on the touch unit 110. Furthermore, in other embodiments, the graphical object 210 may be illustrated as a straight line. Alternatively, the processor 120 may not display the sub-graphical objects 310-313.

In the embodiment, the "picture" means a frame. However, in other embodiments, the "picture" may also mean a field. The disclosure is not limited thereto.

Figure 4:
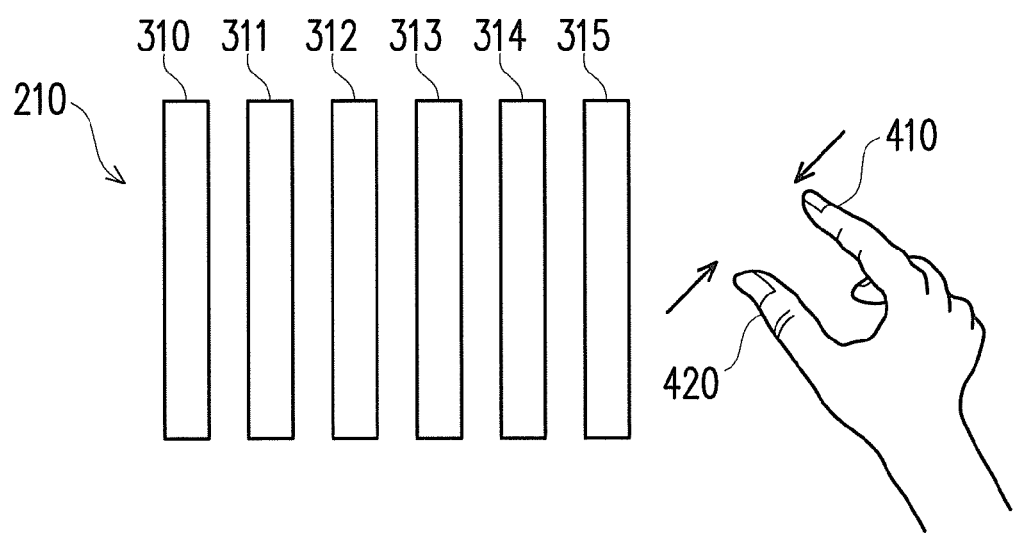
FIG. 4 is diagram illustrating the changing of a display resolution of a graphical object according to an embodiment.

FIG. 4 is a diagram illustrating the changing of a display resolution of the graphical object according to an embodiment.

In an embodiment, the user may utilize two fingers to change a resolution of the time axis. In detail, the processor 120 detects a first medium moving on the touch unit 110 (i.e., a first movement), and a second medium moving on the touch unit 110 (i.e., a second movement). The processor 120 changes a display resolution of the graphical object 210 according to a difference between the first movement and the second movement. When the display resolution of the graphical object 210 is modified, the processor 120 may display more or less number of the sub-graphical objects on the touch unit 110. For example, as illustrated in FIG. 4, when the processor 120 determines a first medium 410 and a second medium 420 are getting closer, the processor 120 zoom-out the sub-graphical objects and displays more sub-graphical objects 310-315 on the touch unit 110. By contrast, when the processor 120 determines the first medium 410 and the second medium 320 are moving away from each other, the processor 120 zoom-in the graphical object 310-314 and displays less sub-graphical objects in the touch unit 110.

Figure 5A:
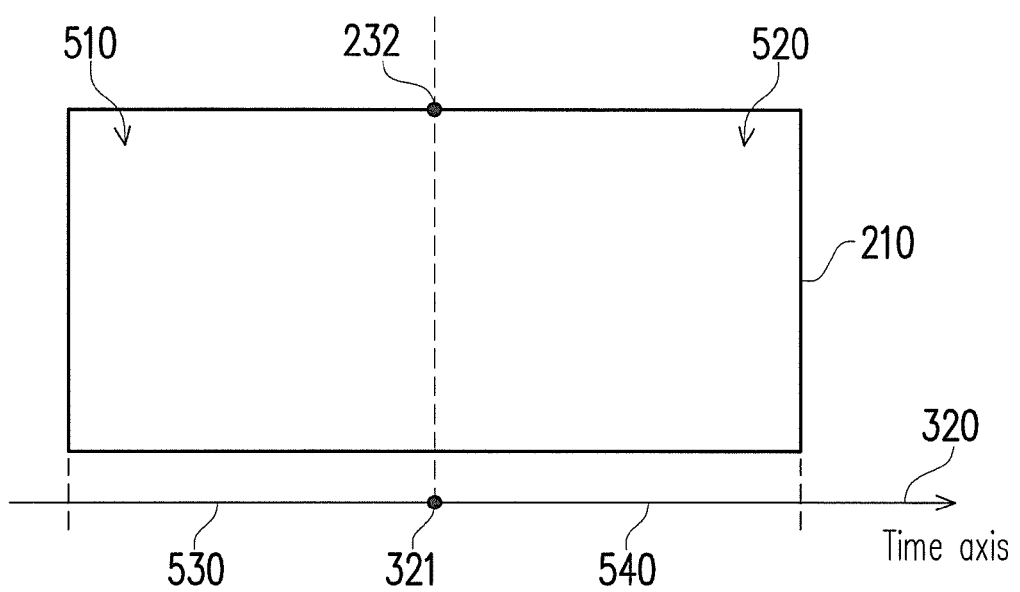
FIGS. 5A and 5B are diagrams illustrating that the graphical object is divided into a first region and a second region according to an embodiment.
Figure 5B:
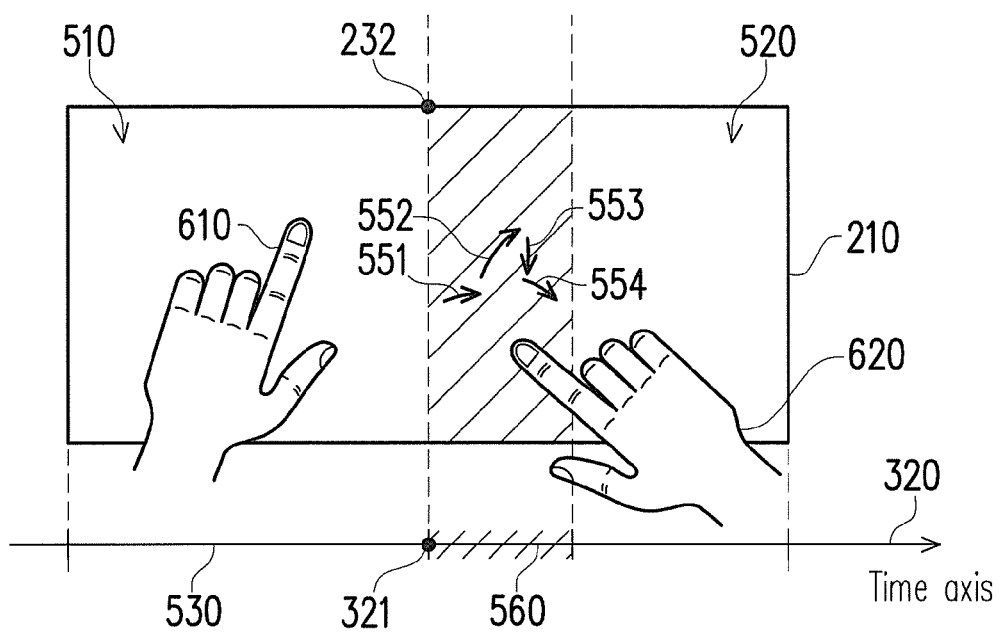

FIGS. 5A and 5B are diagrams illustrating that the graphical object is divided into a first region and a second region according to an embodiment.

With reference to FIG. 5A, after the initial editing picture is determined, the processor 120 splits the graphical object 210 into a first region 510 and a second region 520. In the embodiment, the sub-graphical object corresponding to the initial editing picture is allocated to the second region 520. However, in other embodiment, the sub-graphical object corresponding to the initial editing picture is allocated to the first region 510. The embodiments of the disclosure are not limited thereto. On the other hand, the video is divided into a segment 530 and a segment 540 according to a time point 321 corresponding to the initial editing picture on the time axis 320. Wherein, the first region 510 corresponds to the segment 530, and the second region 520 corresponds to the segment 540.

With reference to FIG. 5B, the processor 120 keeps on detecting the movement of a first medium 610 in the first region 510 and the movement of a second medium 620 in the second region 520. The processor 120 determines a length of an interval and an editing segment according to the initial editing picture and the difference between the first movement and the second movement mentioned above. The first medium and the second medium may move separately. In an embodiment, if one of the first medium and the second medium remains in contact with the touch unit 110, and another medium moves consecutively for multiple times (i.e., the time interval between each movement and a preceding movement does not exceed a specific threshold value), the processor 120 detects the consecutive movements mentioned above and calculates a total distance of the consecutively movements as the movement of the another medium. For example, the first medium 610 remains in contact with the touch unit 110, and the second medium 620 performs a plurality of consecutive movements 551-554. The processor 120 calculates a total distance of the consecutive movements 551-554 as the movement of the second medium 620. Next, the processor 120 determines an editing segment 560 according to the difference between the movements the first medium 610 and the second medium 620. It should be noted that if the consecutive movements 551-554 are in different directions, the processor 120 may configure the movement toward one of the directions as a positive value and the movement toward opposite direction as a negative value, and then calculate the total distance by summing the movements of the consecutive movements 552-554. Alternatively, the processor 120 may view the movements toward different directions as positive values for the calculating the total distance, it may be configured by the user or required selection. In addition, the second medium 620 may be lifted from the touch unit 110 (i.e., the second medium 620 is not in contact with the touch unit 110). For example, after the second medium 620 moves on the touch unit 110 to generate the movements 551, the second medium 620 is lifted from the touch unit 110. Then, the second medium 620 touches the touch unit 110 again within the specific time threshold and moves against the touch unit 110 again to generate another movements 552. Alternatively, between the movements of the consecutive movements 551-554, the second medium 620 may stop moving but remains in contact with the touch unit 110. For example, the second medium 620 first moves against the touch unit 110 to generate the movement 553, and then the second medium 620 stop moving for an amount of time that does not exceed the specific threshold value. At end, the second medium 620 moves again to generate the movement 554.

The processor 120 determines whether the editing segment is an inserting segment or a deleting segment according to an editing operation input by the user. For example, the user may determine the editing operation by selecting a button on the touch unit 110. If the editing operation selected by the user is the inserting operation, then the editing segment is the inserting segment, that is, the user is to insert a segment between the segment 530 and the segment 540. If the editing operation selected by the user is the deleting operation, then the editing segment is the deleting segment, that is, the user is to delete a part of the segment 540.

Figure 6:
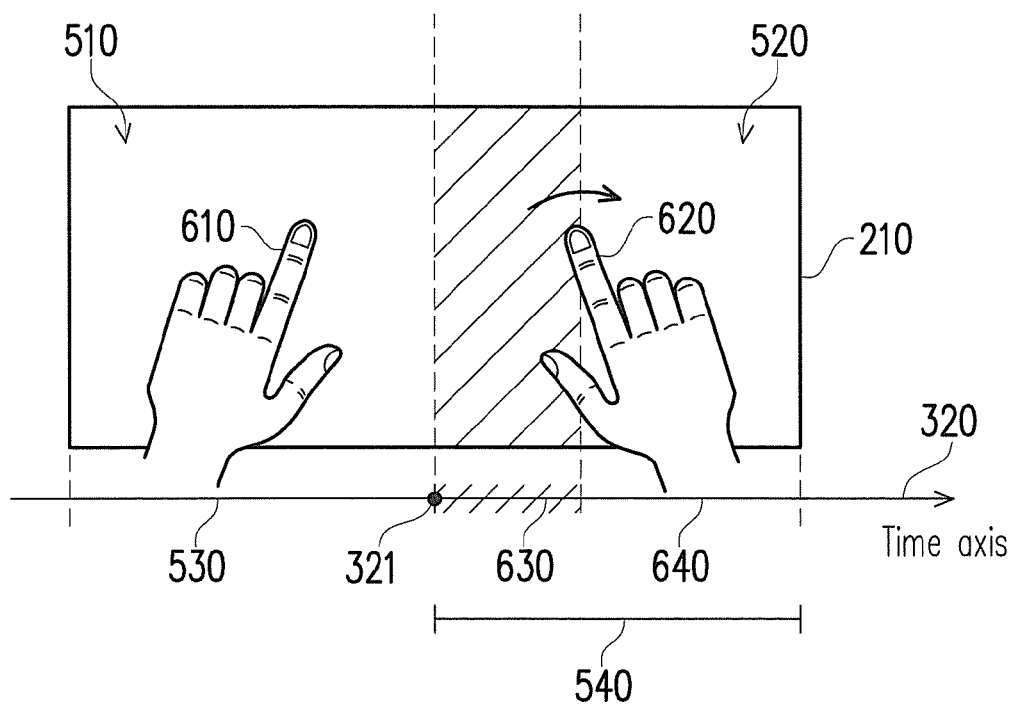
FIG. 6 is a diagram illustrating a deleting operation according to an embodiment.

FIG. 6 is a diagram illustrating the deleting operation according to an embodiment.

With reference to FIG. 6, if the deleting operation is selected by the user, the processor 120 detects the movement of the first medium 610 in the first region 510 and the movement of the second medium 620 in the second region 520. The processor 120 determines a deleting segment 630 from the segment 540 according to the difference between the first movement and the second movement mentioned above. In detail, the deleting segment 630 starts from the time point 321, and the difference between the first and the second movements determines a length of the deleting segment 630. After the deleting segment 630 is removed from the segment 540, and the remaining is a segment 640 (i.e., referred to as a second segment). In other words, a segment in the video other than the segment 530 and the deleting segment 630 is the second segment 640. Herein, the segment 530 is referred to as the first segment, and the deleting segment 630 is referred to as the editing segment. The processor 120 connects the second segment 640 to the end of the first segment 530, and re-encodes the video. It should be noted that the processor 120 does not re-compress the whole segment 530 and the segment 640. Instead, the processor 120 alters a header of part of the pictures in the video or an encoding type of part of the pictures. According to the encoding type of a picture, the picture may be categorized as an I-picture, a P-picture, or a B-picture. If a picture is the I-picture, it represents that the picture is encoded according to the information of itself. If a picture is the P-picture, the picture is encoded according to a forward reference picture of the picture. If a picture is the B-picture, the picture is encoded according a forward reference picture and a backward reference picture.

Figure 7:
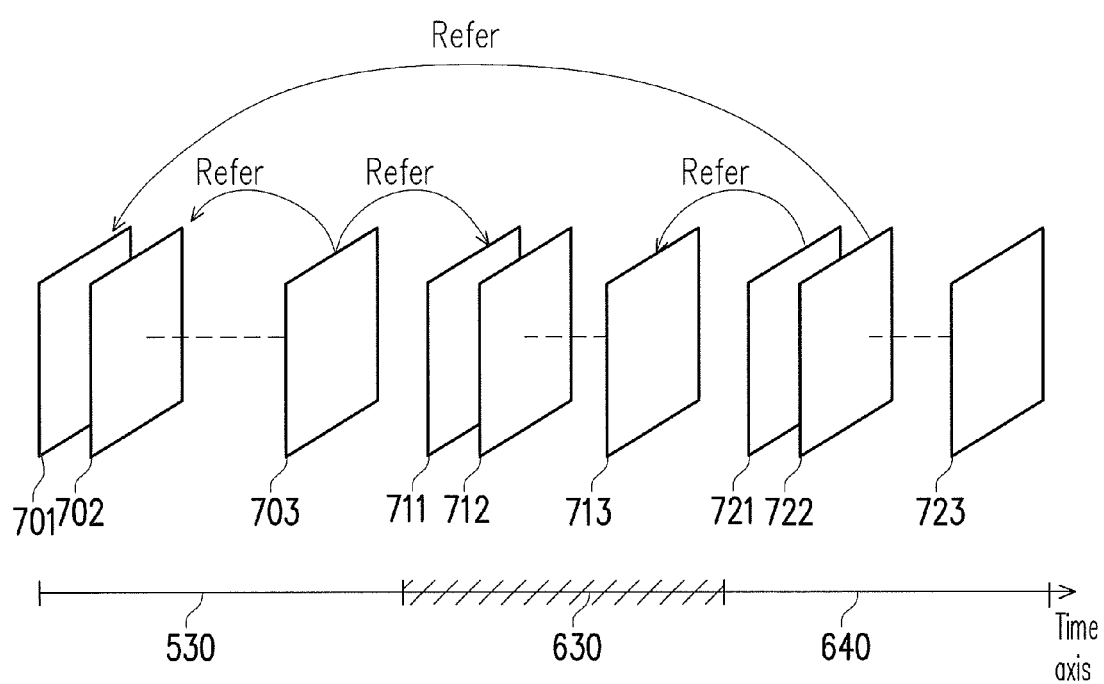
FIG. 7 is a diagram illustrating the encoding of the deleting operation according to an embodiment.

FIG. 7 is a diagram illustrating the encoding of the deleting operation according to an embodiment.

With reference to FIG. 7, the first segment 530 includes a plurality of pictures 701-703, the deleting segment 630 includes a plurality of pictures 711-713, and the second segment 640 includes a plurality of pictures 721-723. The deleting segment 630 follows after the first segment 530 and precedes the second segment 640. Since the deleting segment 630 is removed from the video while the re-encoding of the video, the processor 120 changes the encoding type of some pictures which refer to the pictures in the deleting segment 630.

First, if the pictures in the first segment 530 are I-picture or P-picture, the processor 120 does not process the pictures.

Second, if the first segment 530 includes a B-picture, and the backward reference picture of the B-picture is not included in the first segment 530, the processor 120 changes the B-picture to the P-picture. For example, the picture 703 refers to the picture 702 and the picture 711, and the picture 711 is not included in the first segment 530. Therefore, the processor 120 changes the picture 703 from the B-picture to the P-picture, and thereby the picture 703 is encoded solely according to the picture 702.

Third, if the forward reference picture of a picture (referred to a fourth picture) in the second segment 640 is not included in the first segment 530 and the second segment 640, the processor 120 compresses the fourth picture by a lossless compression algorithm. In the embodiment, the processor 120 utilizes a H.264 standard to encode the video, and the lossless compression algorithm is an Intra Pulse Code Modulation (IPCM). For example, the forward reference picture 713 of the picture 721 is not included in the first segment 530 and the second segment 640, so the processor 120 compresses the picture 721 by the lossless compression algorithm.

Fourth, in the embodiment, the processor 120 encodes the video by the H.264 standard. In the H.264 standard, a short-term reference picture list and a long-term reference picture list are utilized to store the reference pictures that are available. When a P-picture or a B-picture is to be encoded, the processor 120 obtains a reference picture from the short-term reference picture list according to a short-term reference index or a reference picture from the long-term reference picture list according to a long reference index. After a picture is encoded and rebuilt, the picture is included in a short-teem reference index. If the second segment 640 has a second picture, and a short-long reference index of the second picture points to a first picture of the first segment 530, the processor 120 sets a header of a third picture in the first segment 530, so that the first picture is moved from the short-term reference picture list to the long-term reference picture list when the header of the third picture is decoded. The processor 120 also changes the short term reference index of the second picture to the long-term reference index, and the long-term reference index points to the first picture of the long-term reference picture list.

For example, after the picture 701 is encoded and rebuilt, if the picture 701 is referred to as the reference picture of other pictures, the picture 701 is included into the short-term reference picture list. When the picture 702 is encoded, if the picture 702 refers to the picture 701, a short-term reference index of the picture 702 points to the picture 701 in the short-term reference list. The short-term reference index may be represented by a frame number or a picture order count (POC). However, there is an upper limit for the number of the pictures stored in the short-term reference picture list. If the number of the pictures stored in the short-term reference picture list exceeds the upper limit, at least one picture is removed from the short-term reference picture list.

In contrast, the number of the picture stored in the long-term reference picture list is not limited. The long-term reference index is configured to point the pictures in the long-term reference picture list, and the long-term reference index may be represented by a long term picture number. When a picture is pointed to by a short-term reference index and the short-term reference index is changed to the long-term reference index, this represents that the picture is moved from the short-term reference picture list to the long-term reference picture list. Through setting the header of a picture, the processor 120 may perform the aforesaid step of moving the picture from the short-term reference picture list to the long-term reference picture list when the header is decoded by an decoder. In an embodiment, the processor 120 may complete the aforesaid step through a sliding window reference picture marking or an adaptive reference picture marking.

In the embodiment, the picture 722 is within the second segment 640, and a short-term reference index of the picture 722 points toward the picture 701 of the first segment 530. In other words, for the video that is not edited yet, the picture 701 is in the short-term reference picture list when the picture 722 is encoded. However, after the deleting segment 630 is deleted, the short reference index of the picture 722 may point to other pictures. Therefore, the processor 120 sets the header of the picture 703, so that the picture 701 is moved from the short-term reference picture list to the long-term reference picture list when the header of the picture 703 is decoded. Furthermore, the processor 120 also changes the short-long reference index of the picture 722 to the long-term reference index. On other hand, the processor 120 configures the header of an initial picture (i.e., picture 721) in the second segment 640, so that the short-term reference picture list is cleared when the header of the initial picture is decoded. Thus, at beginning of encoding the second segment 640, the short-term reference picture list is cleared already, and the reference picture used by the second segment are stored in the long-term reference picture list.

Figure 8:
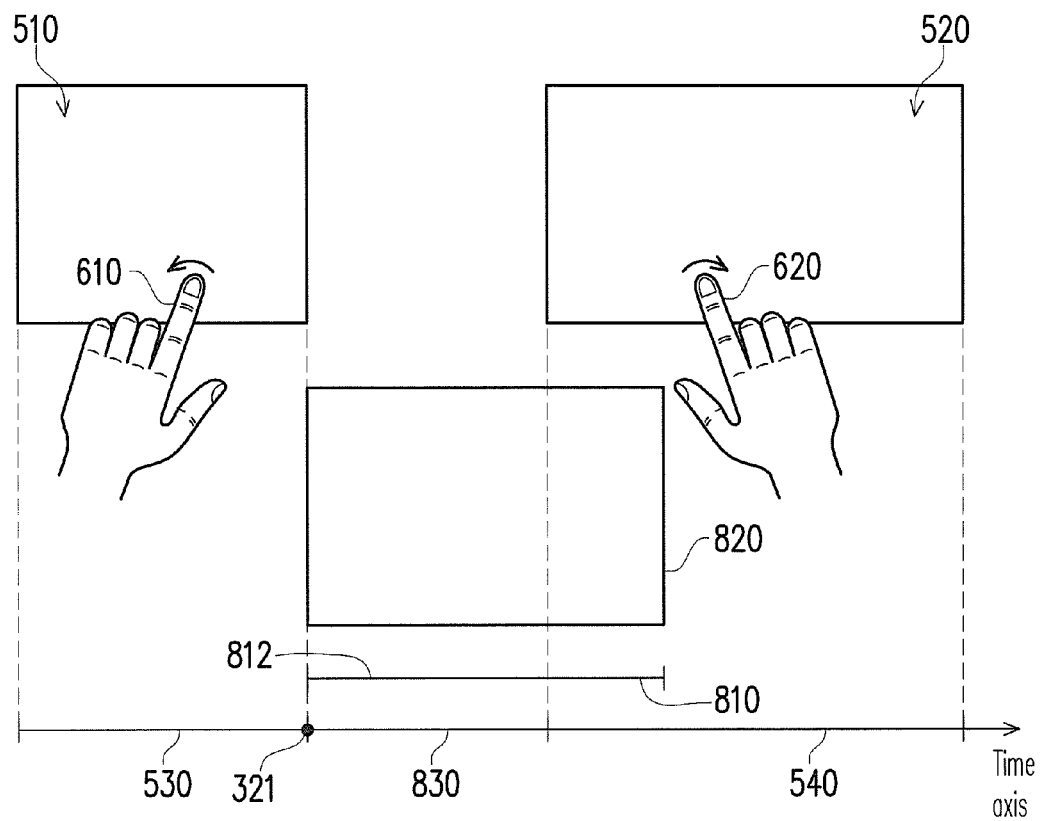
FIGS. 8 and 9 are diagrams illustrating an inserting operation according to an embodiment.
Figure 9:
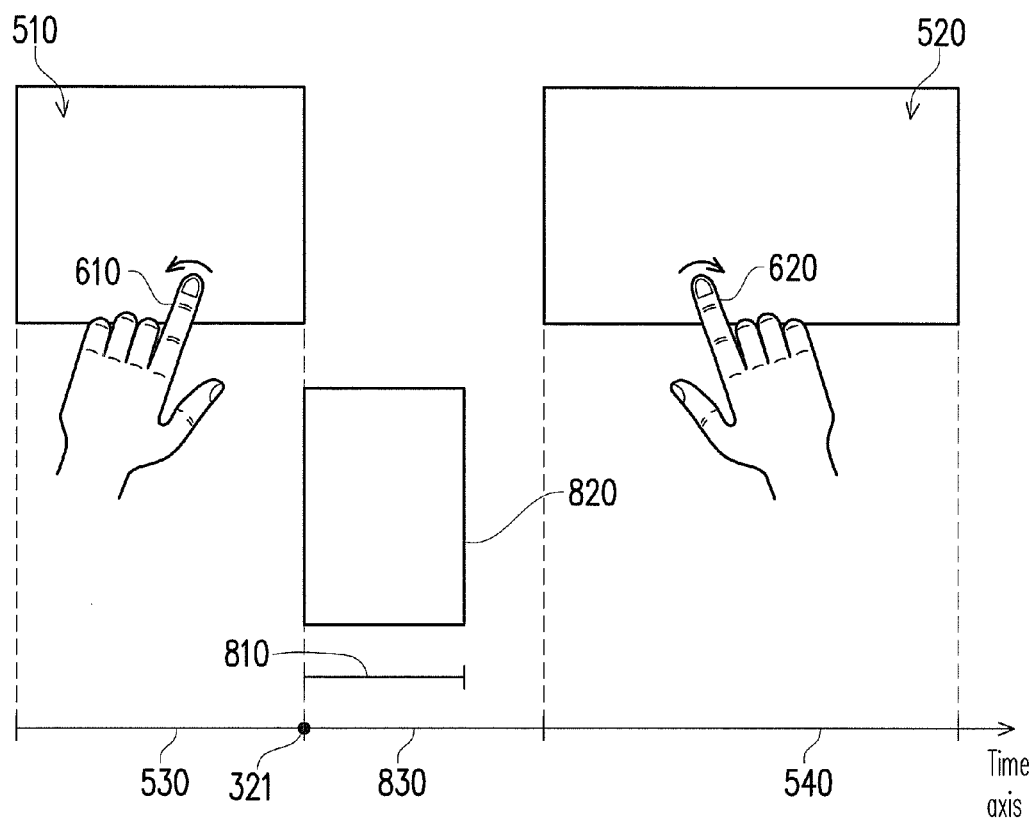

FIGS. 8 and 9 are diagrams illustrating an inserting operation according to an embodiment.

With reference to FIG. 8, if the operation inputted by user is the inserting operation and an inserting segment 810 is selected by the user, the inserting segment 810 may be displayed as a graphical object 820 on the touch unit 110. Similar to the deleting operation, after an initial editing picture is determined, the graphical object 210 is divided into a first region 510 and a second region 520. The first region 510 corresponds to the segment 530, and the second region 520 corresponds to the segment 540 (the segment 540 is herein referred to as a second segment). The processor 120 detects the movement of the first medium 610 in the first region 510 (referred to as the first movement) and the movement of the second medium 620 in the second region 520 (referred to as the second movement). The processor 120 moves the second region 520 according to the difference between the first movement and the second movement. In addition, the processor 120 determines an interval 830 between the first segment 530 and the second segment 540 according to the initial editing picture and the difference between the first movement and the second movement. For example, the processor 120 utilizes the time point 321 as a starting point of the interval 830, and determines a length of the interval 830 according to the difference between the first movement and the second movement. Lastly, the processor 120 inserts the segment 810 into the interval 830.

In detail, the processor 120 determines whether the length of the inserting segment 810 is greater than the length of the interval 830. If the length of the inserting segment 810 is greater than the length of the interval 830, the processor 120 obtains a second inserting segment 812 of the inserting segment 810, and the second inserting segment 812 is inserted between the first segment 530 and the second segment 540. The length of the second inserting segment 812 equals to the length of the interval 830. In other words, after the video editing, the video is composed of the first segment 530, the second inserting segment 812 and the second segment 540. The rest part of the inserting segment 810 except for the second inserting segment 812 is deleted, wherein the second inserting segment 812 is referred to as the editing segment.

On the other hand, as illustrated in FIG. 9, if the length of the inserting segment 810 is less than or equal to the length of the interval 830, the processor 120 sets the length of the interval 830 to be the length of the inserting segment 810, and inserts the inserting segment 810 between the first segment 530 and the second segment 540. In other words, the processor 120 reduces the interval 830. After the video editing, the video is composed of the first segment 530, the inserting segment 810 and the second segment 540. Wherein the inserting segment 810 is referred to as the editing segment.

Figure 10:
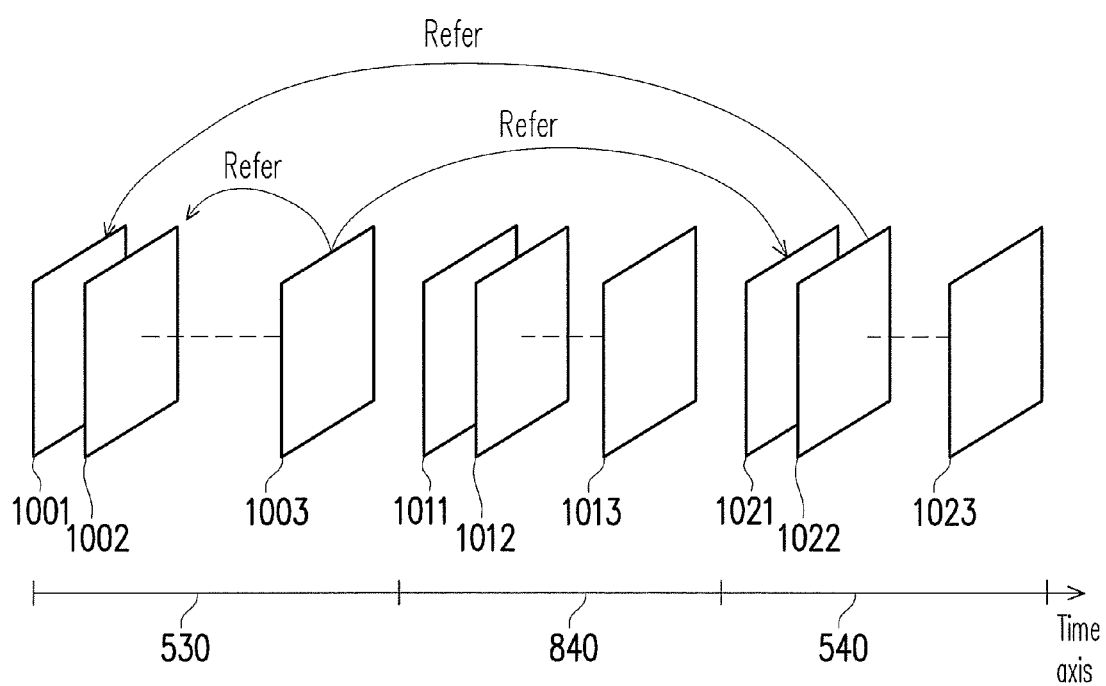
FIG. 10 is a diagram illustrating the encoding of the inserting operation according to an embodiment.

FIG. 10 is a diagram illustrating the encoding of the inserting operation according to an embodiment.

With reference to FIG. 10, the first segment 530 includes a plurality of pictures 1001-1003, an editing segment 840 includes a plurality of pictures 1011-1013, and the second segment 540 includes a plurality of pictures 1021-1023. The editing segment 840 represents a newly inserted segment (i.e., the second inserting segment 812 illustrated in FIG. 8 or the inserting segment 810 illustrated in FIG. 9). During the inserting operation, the processor 120 does not perform any process to the I-picture and the P-picture that are included in the first segment 530. However, if there is a B-picture in the first segment 530 and the backward reference picture of the B-picture is not within the first segment 530, the processor 120 changes the B-picture to the P-picture. For example, picture 1003 is a B-picture referring to the picture 1002 and the picture 1021. Since the backward reference picture 1021 of the picture 1003 is not included in the first segment 530, the processor 120 changes the picture 1003 to the P-picture. That is, the processor 120 encodes the picture 1003 solely according to the picture 1002.

Similar to the deleting operation, if the segment 540 has a second image and the short-term reference index of the second picture points to a first picture of the first segment 530, the processor 120 sets a header of a third picture of the first segment so that the first picture is moved from the short-term reference picture list to the long-term reference picture list when the header of the third picture is decoded. Furthermore, the processor 120 also changes the short-term reference index of the second picture to the long-term reference index, and the long-term reference index points to the first picture of the long-term reference picture list. For example, the short-teen reference index of the picture 1022 points to the picture 1001. Therefore, the processor 120 sets the header of the picture 1003 in the first segment 530, so that the picture 1001 is moved from the short-term reference picture list to the long-term reference picture list when the header of the picture 1003 is decoded. In addition, the short-term reference index of the picture 1022 pointed to the picture 1001 is modified to the long-term reference index.

Particularly, the processor 120 sets a header of an ending picture (i.e., a picture 1013) of the editing segment 840, so that the short-term reference picture list is cleared when the header of the picture 1013 is decoded. As a result, although the pictures 1011-1013 are inserted into the short-term reference picture list while encoding the pictures 1011-1013, the short-term reference picture list is cleared when the second segment 540 is encoded.

On the other hand, the processor 120 sets the headers of the pictures 1011-1013, so that the long-term reference picture list remains unchanged when the headers of the pictures 1011-1013 are decoded. That is, the setting of the long term reference picture list while encoding the first segment is not changed while encoding the editing segment 830. Thus, all of the reference pictures to be used while encoding the second segment 540 are within the long-term reference picture list. Therefore, the I-picture, P-picture, or B-picture within the second segment 540 are not required to be re-compressed by the processor 120, and thus the speed of video encoding is increased.

Figure 11:
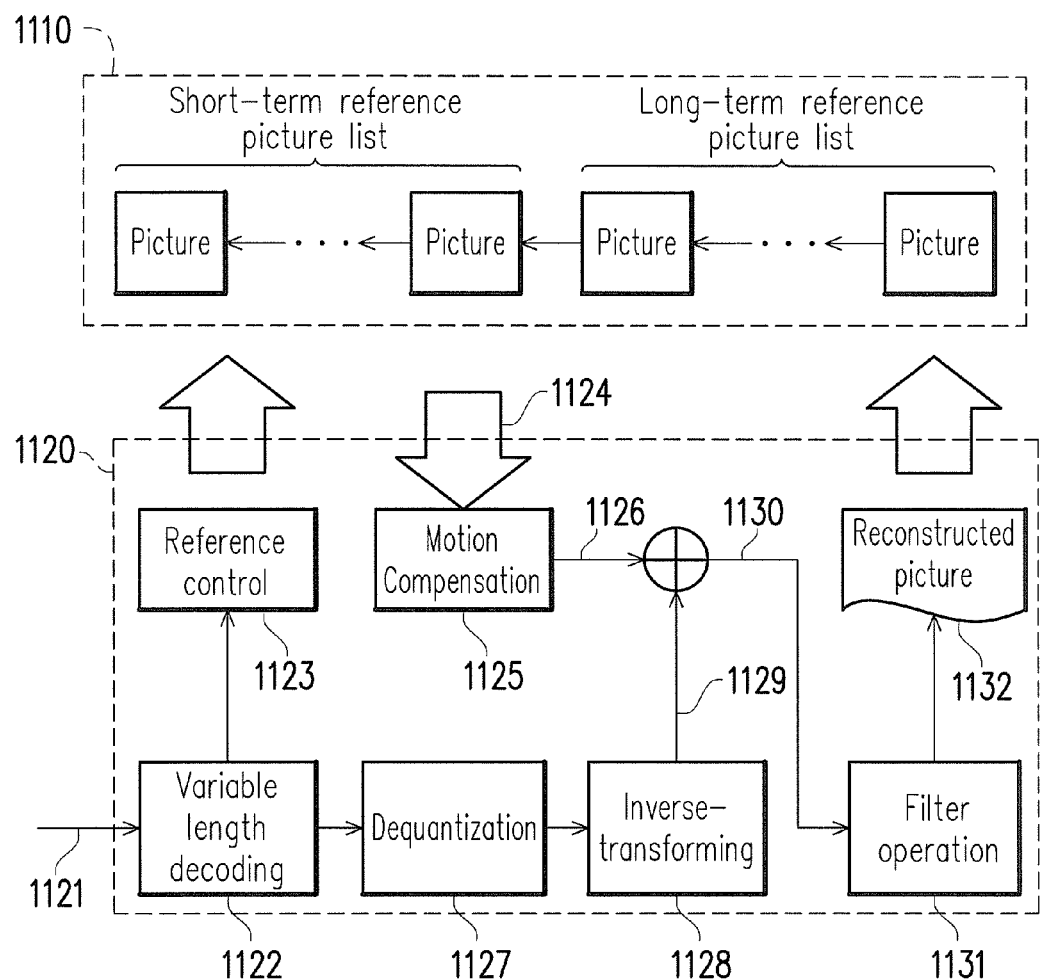
FIG. 11 is a diagram illustrating the re-encoding according to an embodiment.

FIG. 11 is a diagram illustrating the re-encoding of the video according to an embodiment.

With reference to FIG. 11, the process flow of editing video may include a list management procedure 1110 and an encoding procedure 1120. The list management procedure 1110 is configured to manage the short-term reference picture list and the long-term reference picture list, wherein each of the two lists includes one or more pictures. The encoding procedure 1120 is configured to receive a bit stream 1121 before editing, and adjusts the short-term reference picture list and long-term reference picture list according to the bit stream 1121.

In detail, the processor 120 first receives the bit stream 1121 of a video, and performs a variable length decoding 1122. After executing the variable length decoding 1122, the processor 120 obtains a header of each of the pictures, so as to obtain a decoding sequence and identify I-picture, P-picture, and B-picture. The processor 120 executes a reference control 1123 to transmit the short-term reference index or the long-term reference index to the list management procedure 1110. The list management procedure 1110 returns a corresponding reference picture 1124 to the decoding procedure 1120. The processor 120 executes a motion compensation 1125 according to the reference picture and a plurality of motion vectors, so as to obtain a picture 1126. On the other hand, the processor 120 executes a dequantization 1127 and an inverse-transforming 1128 according to the result of the variable length decoding 1122, so as to obtain a plurality of coefficients 1129. The processor 120 adds the picture 1126 and the coefficients 1129 together to obtain a picture 1130, and then a filter operation 1131 is executed to the picture 1130 so as to generate a reconstructed picture 1132. The filter operation 1131 is used for eliminate the block effect in the picture 1130. Lastly, the processor 120 transmits the reconstructed picture 1132 to the list management procedure 1110, and the list management procedure 1110 adds the reconstructed picture 1132 into the short-term reference picture list.

As illustrated in FIG. 11, the video editing device 100 is configured to decode a video. With the steps of video editing described above, a portion of the picture are not required to be re-compressed, and thus the speed of editing video is increased.

Figure 12:
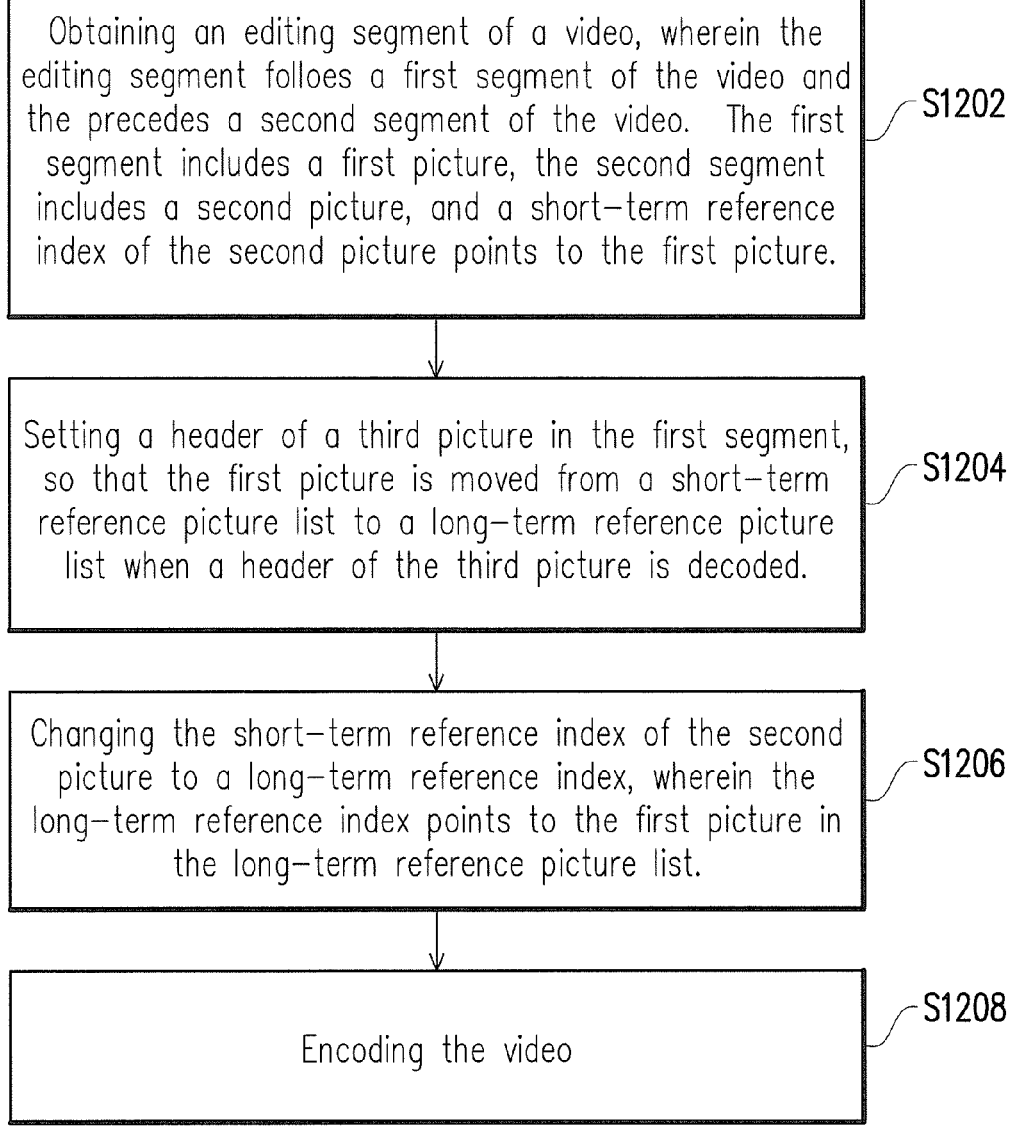
FIG. 12 is a flow chart illustrating a video editing method according to an embodiment.

FIG. 12 is a flow chart illustrating the method of video editing according to an embodiment.

With reference to FIG. 12, in a step S1202, an editing segment of a video is obtained, wherein the editing segment follows a first segment of the video and precedes a second segment of the video. The first segment includes a first picture, and the second segment includes a second picture. In addition, a short-term reference index of the second picture points to the first picture. It should be noted that if an editing operation is a deleting operation, the editing segment is a segment to be deleted. If the editing segment is an inserting operation, the editing segment is a segment to be inserted.

In the embodiment, a method of obtaining the editing segment described in step S1202 is performed through the touch operations of the user on the touch unit. However, in other embodiments, the user may select the editing segment through a mouse or a keyboard, the disclosure is not limited thereto.

In step S1204, a header of a third picture of the first segment is set, so that the first picture is moved from the short-term reference picture list to the long-term reference picture list when a header of the third picture is decoded.

In step S1206, a short-term reference index of the second picture is changed to a long-term reference index, wherein the long-term reference index points to the first picture in the long-term reference picture list.

In step S1208, the video is encoded. For example, some of the B-pictures are changed to the P-picture, or some of the P-pictures are encoded by a lossless compression algorithm.

Each step illustrated in FIG. 12 may be implemented as a module, and executed by a processor. However, each step in FIG. 12 may also be implemented as a circuit. The disclosure is not intended to limit the implementation of video editing method to software or hardware. The details of each step illustrated in FIG. 12 are described as above, so the description is not repeated here.

In summary, the embodiments of the invention set fourth a video editing method and a video editing device. Through the touch operation and the management of the short-term reference picture list and the long-term reference picture list, the speed of video editing is increased.

It will be apparent to those skilled in the art that the descriptions above are several preferred embodiments of the disclosure only, which does not limit the implementing range of the disclosure. Various modifications and variations can be made to the structure of the disclosure without departing from the scope or spirit of the disclosure. The claim scope of the disclosure is defined by the claims hereinafter.

What is claimed is:

1. A video editing method, adapted to a video editing device, the video editing method comprising:

obtaining an editing segment of a video, wherein the editing segment follows a first segment of the video, and the editing segment precedes a second segment of the video, wherein the first segment comprises a first picture, the second segment comprises a second picture, and a short-term reference index of the second picture points to the first picture;

setting a header of a third picture of the first segment, so that the first picture is moved from a short-term reference picture list to a long-tem reference picture list when the header of the third picture is decoded;

changing the short-term reference index of the second picture to a long-term reference index, wherein the long-term reference index points to the first picture in the long-term reference picture list; and encoding the video.

2. The video editing method as claimed in claim 1, further comprising:

determining an editing operation;

if the editing operation is an deleting operation, setting a header of an initial picture of the second segment, so that the short-term reference picture list is cleared when the header of the initial picture is decoded; and if the editing operation is an inserting operation, setting a header of an ending picture of the editing segment, so that the short-term reference picture list is cleared when the header of the ending picture is decoded.

3. The video editing method as claimed in claim 2, further comprising:

if the editing operation is the inserting operation, setting a plurality of headers of a plurality of pictures of the editing segment, so that the long-term reference picture list remains unchanged when the headers of the pictures is decoded.

4. The video editing method as claimed in claim 1, wherein the step of obtaining the editing segment of the video comprises:

displaying a graphical object on a touch unit, wherein the graphical object corresponds to the video;

detecting a track on the touch unit, wherein the track intersects with the graphical object at an intersection point, and an included angle is formed between the track and a normal line on the intersection point; and if the included angle is less than a threshold value, obtaining an initial editing picture of the video according to the intersection point.

5. The video editing method as claimed in claim 4, further comprising:

detecting a first movement made by a first medium on the touch unit and a second movement made by a second medium on the touch unit, wherein the first medium is different from the second medium; and changing a display resolution of the graphical object according to a difference between the first movement and the second movement.

6. The video editing method as claimed in claim 4, wherein the step of obtaining the editing segment of the video further comprises:

dividing the graphical object into a first region and a second region according to the initial editing picture, wherein the first region corresponds to the first segment;

detecting a first movement of a first medium on the first region, and detecting a second movement of a second medium on the second region; and determining the editing segment according to the initial editing picture and a difference between the first movement and the second movement.

7. The video editing method as claimed in claim 6, wherein the step of determining the editing segment according to the initial editing picture and the difference between the first movement and the second movement comprises:

determining an editing operation;

if the editing operation is a deleting operation, determining a deleting segment of the video according to the initial editing picture and the difference between the first movement and the second movement, wherein the deleting segment is the editing segment, and a remaining segment excluding the first segment and the deleting segment in the video is the second segment; and if the editing operation is an inserting operation, determining an interval between the first segment and the second segment according to the initial picture and the difference between the first movement and the second movement, and inserting an inserting segment in the interval, wherein at least a part of the inserting segment is the editing segment.

8. The video editing method as claimed in claim 7, wherein the step of inserting the insert segment in the interval comprises:

determining whether a length of the inserting segment is greater than a length of the interval;

if the length of the inserting segment is less than or equal to the length of the interval, setting the length of the interval as the length of the inserting segment, and inserting the inserting segment between the first segment and the second segment; and if the length of the inserting segment is greater than the length of the interval, obtaining a second inserting segment of the inserting segment, and inserting the second inserting segment between the first segment and the second segment, wherein a length of the second inserting segment equals to the length of the interval.

9. The video editing method as claimed in claim 1, wherein the step of encoding the video further comprises:

if a backward reference picture of a B-picture of the first segment is not within the first segment, changing the B-picture to a P-picture.

10. The video editing method as claimed in claim 1, wherein the step of encoding the video further comprises:

if a forward reference picture of a fourth picture of the second segment is not within the first segment or the second segment, compressing the fourth picture by a lossless compression algorithm.

11. A video editing device, comprising:

a memory, storing a plurality of commands; and a processor, coupled to the memory, configured to execute the commands for executing plurality of steps:

obtaining an editing segment of a video, wherein the editing segment follows a first segment of the video, and the editing segment precedes a second segment of the video, wherein the first segment comprises a first picture, the second segment comprises a second picture, and a short-term reference index of the second picture points to the first picture;

setting a header of a third picture of the first segment, so that the first picture is moved from a short-term reference picture list to a long-term reference picture list when the header of the third picture is decoded;

changing a short-term reference index of the second picture to a long-term reference index, wherein the long-term reference index points to the first picture in the long-term reference picture list; and encoding the video.

12. The video editing device as claimed in claim 11, wherein the steps further comprise:

determining an editing operation;

if the editing operation is an deleting operation, setting a header of an initial picture of the second segment, so that the short-term reference picture list is cleared when the header of the initial picture is decoded; and if the editing operation is an inserting operation, setting a header of an ending picture of the editing segment, so that the short-term reference picture list is cleared when the header of the ending picture is decoded.

13. The video editing device as claimed in claim 12, wherein the steps further comprise:
    if the editing operation is the inserting operation, setting a plurality of headers of a plurality of pictures of the editing segment, so that the long-term reference picture list remains unchanged when the headers of the pictures are decoded.

14. The video editing device as claimed in claim 11, further comprises a touch unit, wherein the step of obtaining the editing segment of the video comprises:
    displaying a graphical object on a touch unit, wherein the graphical object corresponds to the video;
    detecting a track on the touch unit, wherein the track intersects with the graphical object at an intersection point, and an included angle is formed between the track and a normal line on the intersection point; and
    if the included angle is less than a threshold value, obtaining an initial editing picture of the video according to the intersection point.

15. The video editing device as claimed in claim 14, wherein the steps comprise:
    detecting a first movement moved by a first medium on the touch unit and a second movement moved by a second medium on the touch unit, wherein the first medium is different from the second medium; and
    changing a display resolution of the graphical object according to a difference between the first movement and the second movement.

16. The video editing device as claimed in claim 14, wherein the step of obtaining the editing segment of the video further comprises:
    dividing the graphical object into a first region and a second region according to the initial editing picture, wherein the first region corresponds to the first segment;
    detecting a first movement of a first medium on the first region, and detecting a second movement of a second medium on the second region; and
    determining the editing segment according to the initial editing picture and a difference between the first movement and the second movement.

17. The video editing device as claimed in claim 16, wherein the step of determining the editing segment according to the initial editing picture and the difference between the first movement and the second movement comprises:
    determining an editing operation;
    if the editing operation is a deleting operation, determining a deleting segment of the video according to the initial editing picture and the difference between the first movement and the second movement, wherein the deleting segment is the editing segment, and a remaining segment excluding the first segment and the deleting segment in the video is the second segment; and
    if the editing operation is an inserting operation, determining an interval between the first segment and the second segment according to the initial picture and the difference between the first movement and the second movement, and inserting an inserting segment in the interval, wherein at least part of the inserting segment is the editing segment.

18. The video editing device as claimed in claim 17, wherein the step of inserting the insert segment in the interval comprises:
    determining whether a length of the inserting segment is greater than a length of the interval;
    if the length of the inserting segment is less than or equal to the length of the interval, setting the length of the interval as the length of the inserting segment, and inserting the inserting segment between the first segment and the second segment; and
    if the length of the inserting segment is greater than the length of the interval, obtaining a second inserting segment of the inserting segment, and inserting the second inserting segment between the first segment and the second segment, wherein a length of the second inserting segment equals to the length of the interval.

19. The video editing device as claimed in claim 11, wherein the step of encoding the video further comprises:
    if a backward reference picture of a B-picture of the first segment is not within the first segment, changing the B-picture to a P-picture.

20. The video editing device as claimed in claim 11, wherein the step of encoding the video further comprises:
    if a forward reference picture of a fourth picture of the second segment is not within the first segment or the second segment, compressing the fourth picture by a lossless compression algorithm.

* * * * *